United States Patent
Kim et al.

(10) Patent No.: US 10,914,045 B2
(45) Date of Patent: Feb. 9, 2021

(54) HYDROPHILIC MATERIAL OIL FENCE HAVING DOUBLE-POROUS MESH

(71) Applicant: KOREA INSTITUTE OF SCIENCE AND TECHNOLOGY, Seoul (KR)

(72) Inventors: Seong Jin Kim, Seoul (KR); Myoung Woon Moon, Seoul (KR); O Chang Kwon, Seoul (KR); Seo Hyun Cho, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/660,800

(22) Filed: Oct. 23, 2019

(65) Prior Publication Data
US 2020/0123726 A1   Apr. 23, 2020

(30) Foreign Application Priority Data

Oct. 23, 2018  (KR) ........................ 10-2018-0126738

(51) Int. Cl.
*E02B 15/06*  (2006.01)
*E02B 15/08*  (2006.01)
*E02B 15/10*  (2006.01)

(52) U.S. Cl.
CPC .......... *E02B 15/0814* (2013.01); *E02B 15/06* (2013.01); *E02B 15/0807* (2013.01); *E02B 15/0864* (2013.01); *E02B 15/101* (2013.01)

(58) Field of Classification Search
CPC .......... E02B 15/04; E02B 15/06; E02B 15/08; E02B 15/0814; E02B 15/0857; E02B 15/0864; E02B 15/0885; E02B 15/0892

USPC ..................................................... 405/60, 63
See application file for complete search history.

(56) References Cited

U.S. PATENT DOCUMENTS

| 3,667,235 A * | 6/1972 | Preus ...................... E02B 15/06 405/63 |
| 3,984,987 A * | 10/1976 | Light, Jr. .................. E02B 3/00 405/63 |
| 4,362,631 A * | 12/1982 | Bocard ................. E02B 15/048 210/776 |
| 5,056,958 A * | 10/1991 | Campbell ............... E02B 15/08 405/68 |
| 5,071,286 A * | 12/1991 | Separovich ............. E02B 15/08 405/66 |

(Continued)

FOREIGN PATENT DOCUMENTS

| CH | 677242 A5 * | 4/1991 | ............ E02B 15/08 |
| JP | 62041812 A * | 2/1987 | ............ E02B 15/08 |

(Continued)

OTHER PUBLICATIONS

Korean Office Action for KR Application No. 10-2018-0126738 dated Apr. 28, 2020.

*Primary Examiner* — Frederick L Lagman
(74) *Attorney, Agent, or Firm* — Cantor Colburn LLP

(57) ABSTRACT

Disclosed is a hydrophilic material oil fence having a double-porous mesh. The hydrophilic material oil fence having the double-porous mesh includes a floating body floating on a water surface, and a skirt coupled to an upper portion and a lower portion of the floating body and made of a hydrophilic material through which a hydrophilic fluid selectively passes. A mesh hole size of a partial region of the skirt and a mesh hole size of the other region of the skirt are different.

7 Claims, 11 Drawing Sheets

(56) References Cited

U.S. PATENT DOCUMENTS

| | | | | |
|---|---|---|---|---|
| 6,558,075 B2* | 5/2003 | Benedict | .................. | E02B 3/04 |
| | | | | 256/12.5 |
| 6,616,383 B2* | 9/2003 | Janz | ......................... | E02B 3/04 |
| | | | | 405/21 |
| 6,722,817 B2* | 4/2004 | Benedict | .................. | E02B 3/04 |
| | | | | 405/15 |
| 8,465,231 B2* | 6/2013 | Christopher | .............. | E02B 3/04 |
| | | | | 256/12.5 |
| 8,747,027 B1* | 6/2014 | Singleton | ................. | E02B 3/00 |
| | | | | 405/302.6 |
| 8,807,869 B1* | 8/2014 | Lee | ...................... | B63B 21/502 |
| | | | | 405/27 |
| 2016/0017559 A1* | 1/2016 | Rasmussen | ......... | E02B 15/0807 |
| | | | | 405/63 |

FOREIGN PATENT DOCUMENTS

| | | | | |
|---|---|---|---|---|
| KR | 101149032 B1 | | 5/2012 | |
| KR | 101648476 B1 | | 8/2016 | |
| KR | 1020180076882 | | 7/2018 | |
| WO | WO-2012116548 A1 * | | 9/2012 | ......... E02B 15/0807 |

* cited by examiner

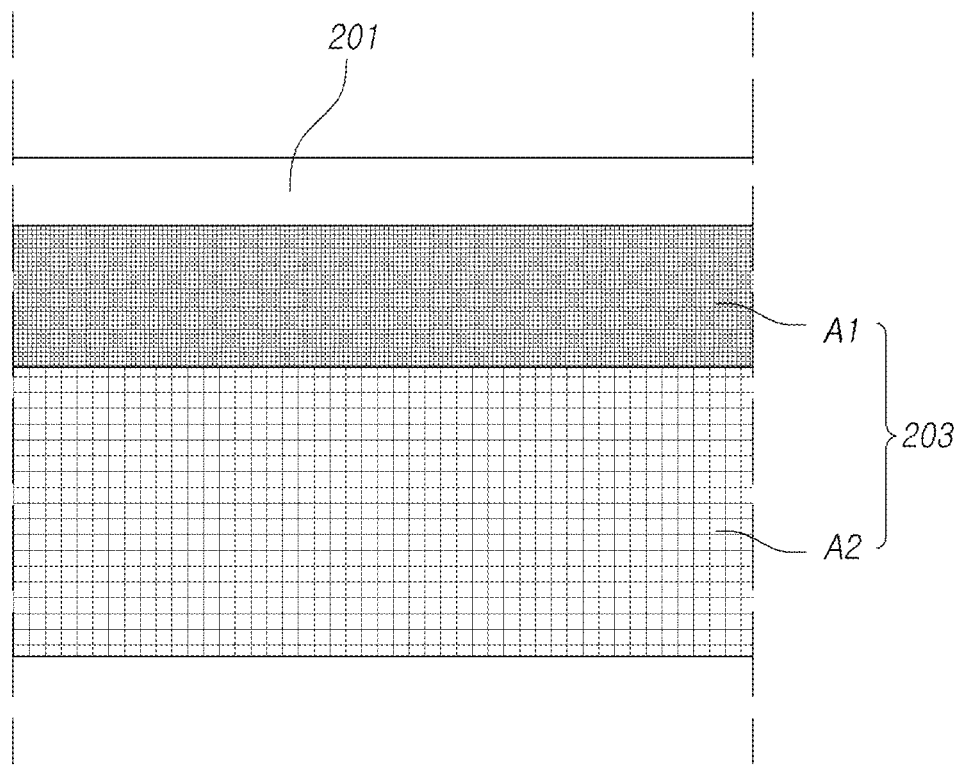

FIG. 3

| Hole size [μm] | Pressure [Pa] | |
|---|---|---|
| 0 | 804900 | ← General Oil Fence |
| 10 | 158800 | |
| 20 | 25780 | |
| 30 | 8001 | ← Oil Fence having Single-pore Mesh |
| 50 | 3276 | |
| 100 | 1088 | |
| 200 | 557.5 | |

FIG. 5

|  | 10μm Fabric Net (Single-pore) | 10μm/100μm Fabric Net (Double-pore) |
|---|---|---|
| Net Fiber Diameter [μm] | 50 | |
| Upper Skirt Length [mm] | 200 | |
| Hole size in the upper skirt [μm] | 10 | |
| Lower Skirt Length [mm] | 300 | |
| Hole size in the lower skirt [μm] | - | 100 |
| Maximum Water Pressure [kPa] | 158.8 | 2.0 |

HYDROPHILIC MATERIAL OIL FENCE HAVING DOUBLE-POROUS MESH

CROSS-REFERENCE TO RELATED APPLICATION

This application claims priority to Korean Patent Application No. 10-2018-0126738, filed on 2018 Oct. 23, and all the benefits accruing therefrom under 35 U.S.C. § 119, the contents of which in its entirety are herein incorporated by reference.

BACKGROUND

1. Field

The present disclosure relates to a hydrophilic material oil fence having a double-porous mesh.

2. Description of the Related Art

Inadvertent spills of petroleum-based oil or hazardous and noxious substances (HNS) occur frequently in the ocean or river due to negligence or the like.

At this time, the petroleum-based oil or hazardous and noxious substances float to the surface of the ocean and river and rapidly spread to the surroundings, causing serious pollution to the surrounding environment, and enormous efforts are required to remove the petroleum-based oil or hazardous and noxious substances.

Thus, in the event of spill of oil or hazardous and noxious substances (HNS), it is important to respond promptly and reliably remove the oil or hazardous and noxious substances (HNS).

In general, when oil is spilled into the ocean or river, a primary spill preventer is provided by installing an oil boom, an oil capturing net, an oil fence, and the like, and an emulsifying agent is sprayed on the oil collected in the oil capturing net. Then, the oil is deposited on the seabed or recovered using oil recovery equipment such as an oil skimmer or adsorption cloth.

However, if the existing oil capturing net or oil fence is used, its balance may be lost or oil may be leaked therebelow due to strong water pressure caused by fast flow velocity in areas with strong tidal current or high wave height, thereby drastically reducing its effect. Thus, it is difficult to use the existing oil capturing net or oil fence in sea areas or rivers usually with a tidal current over 3 knots (about 1.5 m/sec).

RELATED LITERATURES

Patent Literature

Korean Patent No. 10-1149032, 'Oil fence and its storage method'

SUMMARY

The present disclosure is designed based on the above background, and an object of the present disclosure is to use a hydrophilic oil-separating mesh material in a skirt portion, so that the entire skirt has a property of passing water but not passing oil and thus the skirt receives a less resisting force against a water pressure, thereby enabling to rapidly and reliably capture oil or hazardous and noxious substances in water stably even in areas with strong tidal currents or high wave heights having a high flow velocity.

At this time, when oil having a relatively low viscosity of less than 100 cSt, such as gasoline or diesel, is spilled, small pores of less than 30 μm should be used to prevent the oil from leaking. In this case, excessive water pressure is applied to the net, so it is difficult to use the small pores at situations where the net is pulled at high speed or strong tidal current is present.

In the present disclosure, in order to solve the above difficulties, different from the conventional technique where the skirt is configured using a single-porous mesh, a hydrophilic oil-separating material having a small mesh hole size is disposed at an upper portion of the skirt where the oil spilled to the sea is mainly in contact, thereby improving oil recovery ability. Also, a hydrophilic oil-separating material with a large mesh hole size is disposed at a lower portion of the skirt to discharge water quickly, thereby minimizing the adverse effect caused by an increased water pressure.

In addition, by reducing the tension applied to a body of the fence due to the water pressure applied to the skirt, the skirt may be formed to have along length.

The object of the present disclosure is not limited thereto, and other objects not mentioned herein will be clearly understood by those skilled in the art from the following description.

In one aspect, there is provided a hydrophilic material oil fence having a double-porous mesh, comprising: a floating body floating on a water surface; and a skirt coupled to an upper portion and a lower portion of the floating body and made of a hydrophilic material through which a hydrophilic fluid selectively passes, wherein a mesh hole size of a partial region A1 of the skirt and a mesh hole size of the other region A2 of the skirt are different.

In addition, there is provided a hydrophilic material oil fence having a double-porous mesh, wherein in the skirt, the partial region A1 is formed at an upper side, and the other region A2 is formed at a lower side of the partial region A1.

In addition, there is provided a hydrophilic material oil fence having a double-porous mesh, wherein the mesh hole size of the partial region A1 is smaller than the mesh hole size of the other region A2.

In addition, there is provided a hydrophilic material oil fence having a double-porous mesh, wherein the mesh hole size of the partial region A1 is 10 μm or more and 200 μm or less.

In addition, there is provided a hydrophilic material oil fence having a double-porous mesh, wherein the mesh hole size of the other region A2 is 50 μm or more and 500 μm or less.

In addition, there is provided a hydrophilic material oil fence having a double-porous mesh, wherein the skirt has a length of 20 cm or more and 150 cm or less.

According to an embodiment of the present disclosure, since a hydrophilic oil-separating mesh material having two or more pore sizes is disposed at an upper portion and a lower portion of the skirt, the entire skirt is allowed to pass water, but the upper portion of the skirt where the hydrophilic oil-separating material with a small mesh hole size is disposed effectively prevents the oil from leaking out and water is rapidly discharged through the hydrophilic oil-separating material with a great mesh hole size disposed at the lower portion of the skirt, thereby drastically reducing the resisting force applied to the skirt. Thus, it possible to reliably and surely capture oil or hazardous and noxious substances in water stably even in areas with strong tidal currents or great wave heights.

In addition, even when strong water pressure is applied to the oil fence (skirt) since strong tidal current having a flow velocity over 3 knots is generated or a ship is moving at high speed to tow the oil fence for recovering oil, water effectively passes through the skirt, and thus the water pressure applied to the skirt is reduced, thereby preventing the oil from leaking due to damage or balance loss of the oil fence.

In addition, by reducing the tension applied to the skirt due to the water pressure, it is possible to form the skirt in a long length.

BRIEF DESCRIPTION OF THE DRAWINGS

FIG. 2 is a diagram showing a hydrophilic material oil fence having a double-porous mesh according to an embodiment of the present disclosure.

FIGS. 3 and 4 are diagrams for comparing pressures according to mesh hole sizes of a general oil fence, an oil fence having a single-pore mesh and the oil fence having a double-porous mesh.

FIG. 5 is a diagram showing an experiment result table of the oil fence having a single-pore mesh and the oil fence having a double-porous mesh according to an embodiment of the present disclosure.

FIGS.

DETAILED DESCRIPTION

Hereinafter, some embodiments of the present disclosure will be described in detail with reference to exemplary drawings. In adding reference signs to components of each drawing, it should be noted that the same reference signs are assigned to the same components as much as possible even though they are shown in different drawings. Also, in describing the present disclosure, if it is determined that a detailed description of the related known structure or function may obscure the gist of the present disclosure, the detailed description thereof will be omitted.

In addition, in describing the components of the present disclosure, terms such as "first", "second", "A", "B", "(a)" and "(b)" may be used. These terms are only for distinguishing the corresponding component from another component, and the nature, order or sequence of the components are not limited by the terms. If a component is described as being "connected", "coupled" or "contacted" to another component, that component may be directly connected or contacted to another component, but it should also be understood that any other element(s) may be further "connected", "coupled" or "contacted" between these component.

Figure 1A:
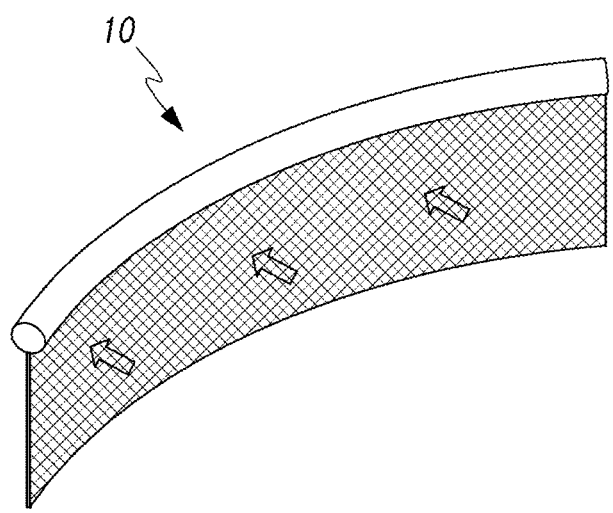
FIGS. 1A, 1B and 1C are diagrams showing a conventional oil fence, which blocks both water and oil.
Figure 1B:
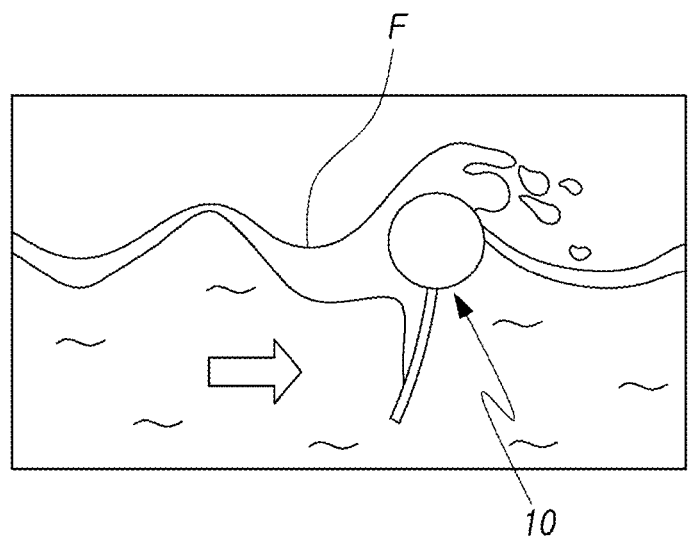
Figure 1C:
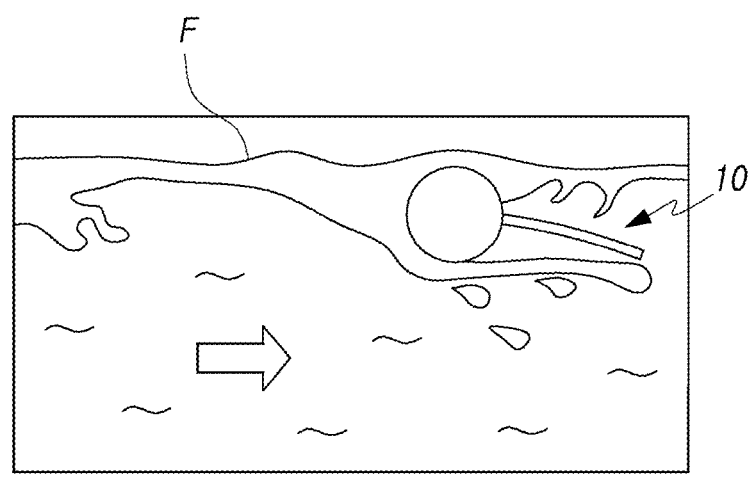

FIGS. 1A, 1B and 1C are diagrams showing a conventional oil fence, which blocks both water and oil.

FIG. 2 is a diagram showing a hydrophilic material oil fence having a double-porous mesh according to an embodiment of the present disclosure.

Figure 4:
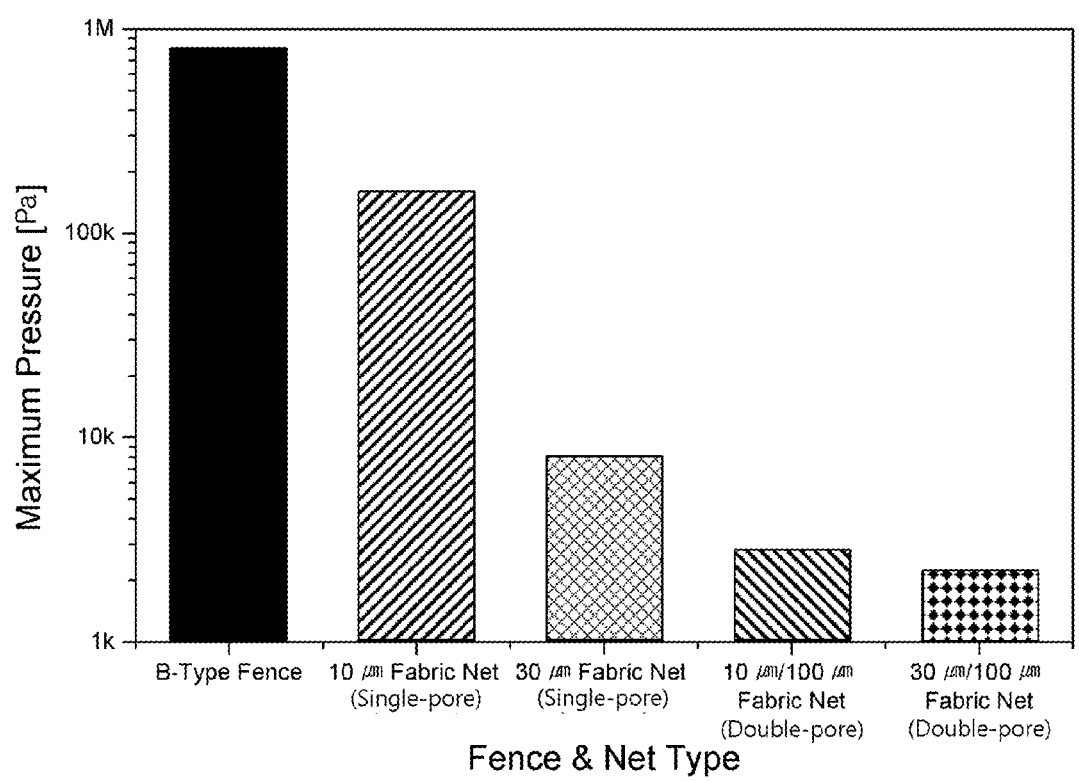

FIGS. 3 and 4 are diagrams for comparing pressures according to mesh hole sizes of a general oil fence, an oil fence having a single-pore mesh and the oil fence having a double-porous mesh.

FIG. 5 is a diagram showing an experiment result table of the oil fence having a single-pore mesh and the oil fence having a double-porous mesh according to an embodiment of the present disclosure.

Figure 6A:
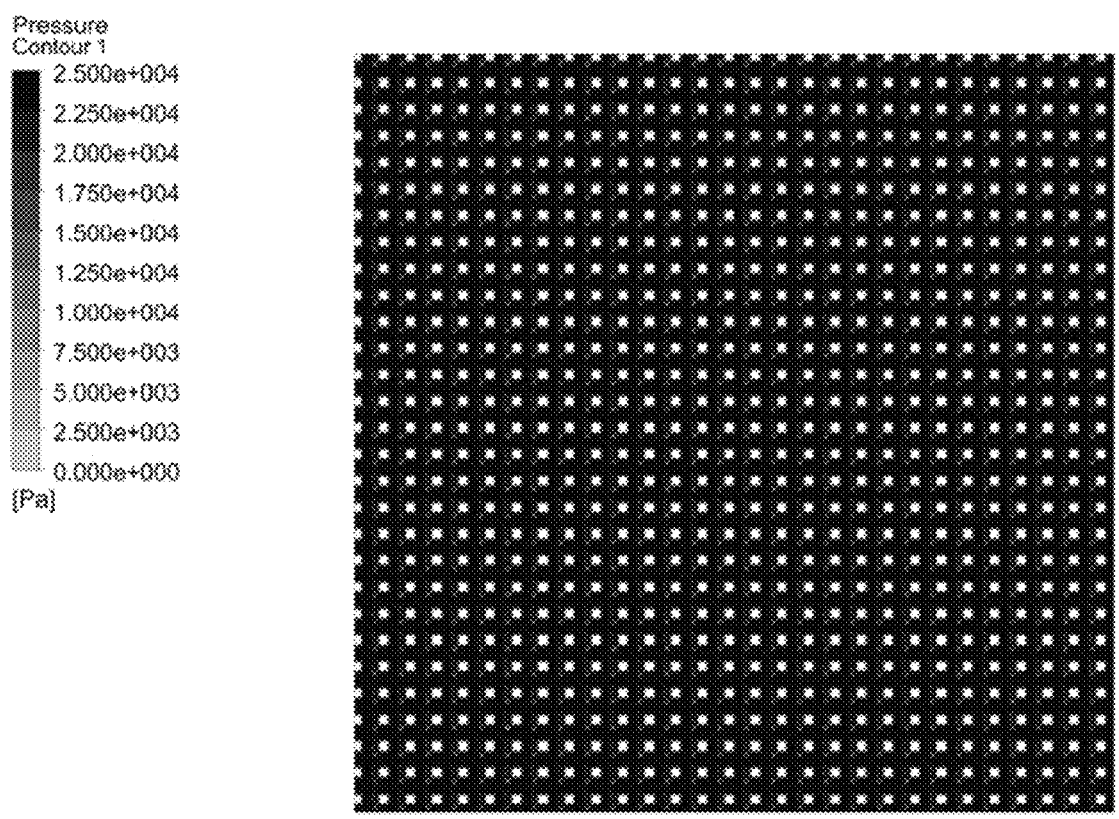
FIGS. 6A and 6B are diagrams showing an experiment result table of the oil fence having a single-pore mesh in FIG. 5.
Figure 6B:
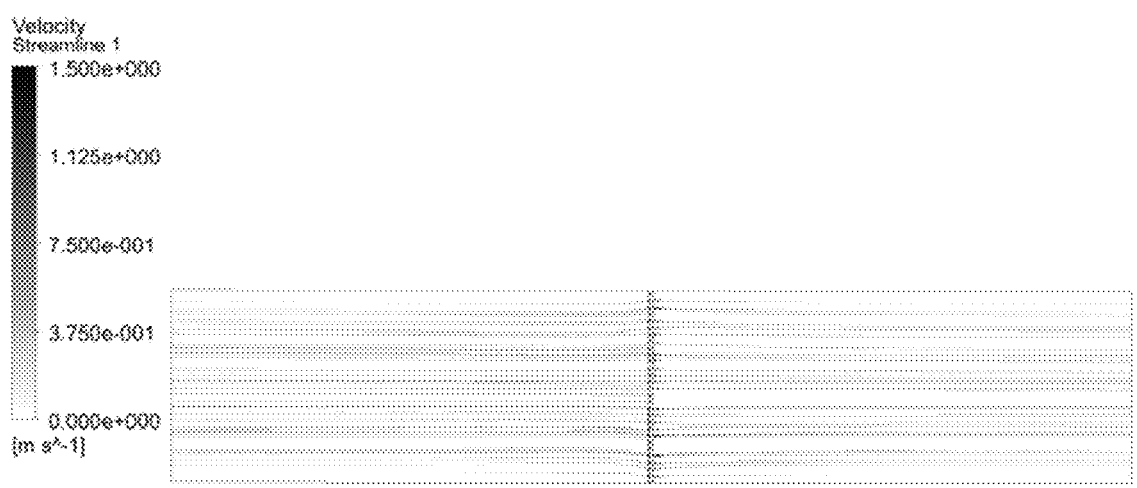

FIGS. 6A and 6B are diagrams showing an experiment result table of the oil fence having a single-pore mesh in FIG. 5.

Figure 7A:
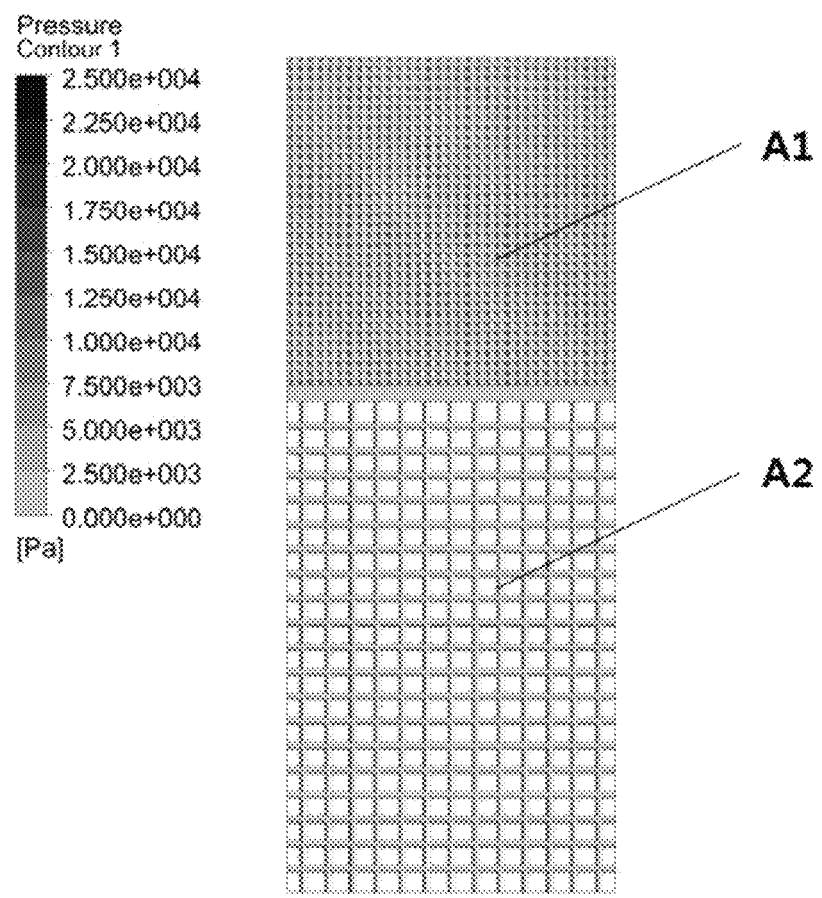
FIGS. 7A and 7B are diagrams showing an experiment result table of the oil fence having a double-porous mesh according to an embodiment of the present disclosure in FIG. 5.
Figure 7B:
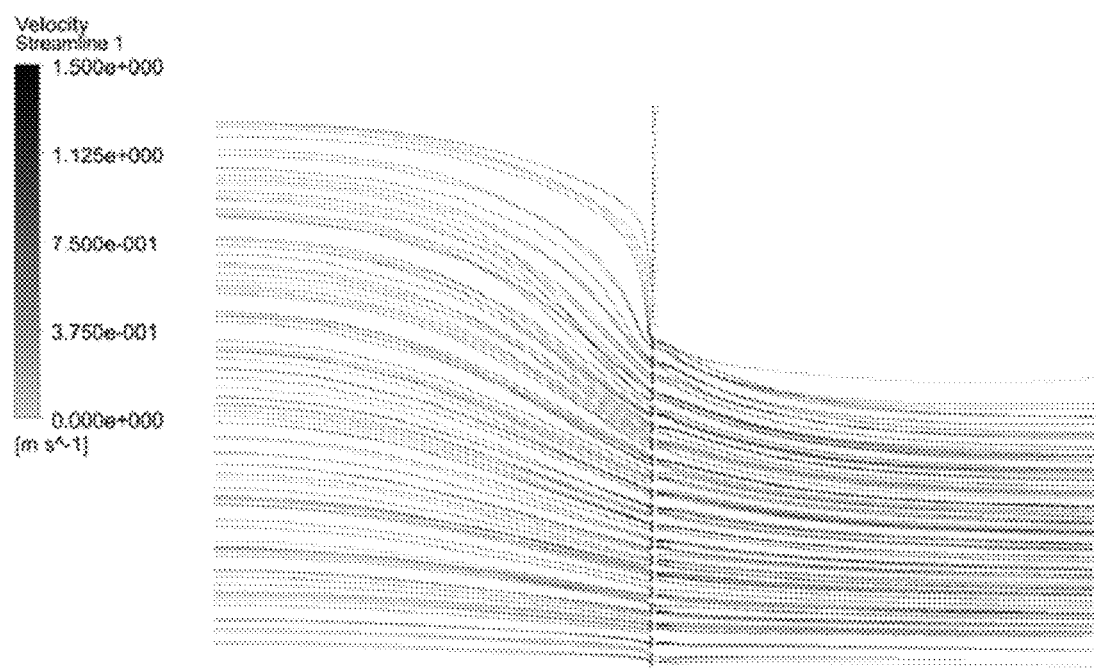

FIGS. 7A and 7B are diagrams showing an experiment result table of the oil fence having a double-porous mesh according to an embodiment of the present disclosure in FIG. 5.

As shown in these figures, a hydrophilic material oil fence 200 with a double-porous mesh according to an embodiment of the present disclosure includes a floating body 201 floating on a water surface; and a skirt 203 coupled to a lower portion of the floating body 201 and made of a hydrophilic material through which a hydrophilic fluid selectively passes, wherein a mesh hole size of a partial region A1 of the skirt and a mesh hole size of the other region A2 of the skirt are different.

In the figures, mesh pores are exaggerated to clearly show different mesh hole sizes.

Meanwhile, in the case of the conventional oil fence 10 that block both water and oil, as shown in FIG. 1A, FIG. 1B and FIG. 1C, when a strong tidal current occurs or when a ship is towing the oil fence 10 while driving at high speed for oil recovery, the oil fence 10 is damaged and loses balance due to a strong water pressure(arrows shown in the FIG. 1A, FIG. 1B and FIG. 1C) applied to the oil fence 10, and thus the oil F leaks out of the oil fence 10. However, according to an embodiment of the present disclosure, the above problem is solved.

Hereinafter, each component is explained in full detail.

The floating body 201 is formed to float on the water surface. For example, the floating body 201 may be formed to have a cylinder shape, a polygonal pillar shape, or the like, and its length may also vary.

Of course, in order to improve the buoyancy of the floating body 201, for example, an air pocket made of rubber or vinyl may be installed to an inner side or an outer side of the floating body 201.

Subsequently, the skirt 203 is coupled to the upper portion or the lower portion of the floating body 201.

The skirt 203 is made of a hydrophilic material through which a hydrophilic fluid selectively passes.

Here, the hydrophilic material may selectively use a mesh having different hole sizes.

Of course, the skirt 203 may be formed by coupling a hydrophilic separator made of a hydrophilic material to a surface thereof.

Meanwhile, in the skirt 203, the mesh hole size of the partial region A1 and the mesh hole size of the other region A2 are different.

More specifically, the partial region A1 of the skirt 203 is formed at an upper side, and the other region A2 is formed at a lower side of the partial region A2.

More specifically, the mesh hole size of the partial region A1 of the skirt 203 is smaller than the mesh hole size of the other region A2.

For example, the partial region A1 of the skirt 203 may be formed to have a mesh pore size 10 μm or more and 200 μm or less, and the other region A2 may be formed to have a mesh pore size 50 μm or more and 500 μm or less so that oil is suppressed not to pass and water passes therethrough more quickly than the partial region A1.

As a result, the hydrophilic material oil fence 200 having a double-porous mesh according to an embodiment of the present disclosure allows water to pass easier while suppressing oil not to pass.

Meanwhile, if a site where the oil fence 200 is to be installed has a small depth or the flow velocity in an area with a water depth less than 1 m is different from the flow velocity of the water surface, the partial region A1 of the skirt 203 may be divided into two or more regions.

In addition, the skirt 203 may be, for example, formed to have a length of 20 cm or more and 150 cm or less.

Moreover, although not shown in the figures, a weight member may be coupled and fixed to a lower end of the skirt 203. The weight member may be fixed to a coupling hole formed at the lower end of the skirt 203 or be connected and fixed to the lower end of the skirt 203 by a fixing member such as a rope or a hook.

Meanwhile, in the case of a general oil fence having a skirt through which both water and oil cannot pass, a pressure of about 800 kPa is applied to the skirt by a flow velocity of 1 knot. However, in the hydrophilic material oil fence having a double-porous mesh according to an embodiment of the present disclosure, it can be found that the pressure applied to the skirt is sharp decreased to about 3 kPa, even to about 1 kPa, when the skirt has a general thickness of 50 μm to 100 μm.

As described above, according to an embodiment of the present disclosure, the entire skirt allows water to pass therethrough, but the hydrophilic oil-separating material having dense mesh pores is disposed at the upper portion of the skirt that is primarily in contact with oil, thereby preventing the oil from leaking. In addition, since the hydrophilic oil-separating material with a large mesh hole size is disposed at the lower portion of the skirt, it is possible to prevent the unnecessary increase of resisting force, compared to the conventional technique using a single-porous mesh. Thus, it is possible to rapidly and surely capture oil or hazardous and noxious substances in water stably even in areas with strong tidal currents or high wave heights having a high flow velocity.

In addition, even when a strong water pressure is applied to the oil fence (skirt) since oil is recovered in areas where a strong tidal current with a flow velocity over 3 knots flows or since a ship is moving at high speed to tow the oil fence for recovering oil, the pressure applied to the skirt is reduced due to the effective passage of water, thereby preventing the oil from spilling due to breakage or balance loss of the oil fence.

In addition, by reducing the tension applied to the skirt due to the water pressure, it is possible to form the skirt in a long length.

Here, the description of the present disclosure is not necessarily limited to the above embodiments, even though all of the components constituting the embodiment of the present disclosure are described as being combined into a single unit or operating in combination. In other words, within the scope of the present disclosure, all of the components may be selectively combined and operated.

In addition, the terms "comprise", "include" or "have" used above mean that the corresponding component is capable of including elements unless otherwise stated, and thus, it should be construed that it may further include other components, without including other components. All terms, including technical and scientific terms, have the same meaning as commonly understood by those skilled in the art, unless otherwise defined. Commonly used terms, such as those defined in a dictionary, should be construed as being consistent with the contextual meaning of the related art and shall not be construed in an ideal or overly formal sense unless explicitly stated in the present disclosure.

The above description is merely illustrative of the technical idea of the present disclosure, and a person skilled in the art may make various modifications and changes without departing from the essential characteristics of the present disclosure. Accordingly, the embodiments in the present disclosure are not intended to limit the technical scope of the present disclosure but to illustrate the present disclosure, and the scope of the present disclosure is not limited by these embodiments. The scope of the present disclosure should be defined by the appended claims, and any technical idea falling within the scope of the present disclosure shall be construed as being included in the scope of the present disclosure.

REFERENCE SIGNS

10: oil fence
200: oil fence
201: floating body
203: skirt

What is claimed is:
1. A hydrophilic material oil fence having a double-porous mesh, comprising:
 a floating body floating on a water surface; and
 a skirt coupled to a lower portion of the floating body and made of a hydrophilic material through which a hydrophilic fluid selectively passes,
 wherein a mesh hole size of a first partial region (A1) of the skirt and a mesh hole size of a second partial region (A2) of the skirt are different,
 wherein in the skirt, the first partial region (A1) is formed at an upper side, and the second partial region (A2) is formed at a lower side of the first partial region (A1),
 wherein the mesh hole size of the first partial region (A1) is smaller than the mesh hole size of the second partial region (A2),
 wherein the mesh hole size of the first partial region (A1) is 10 μm or more and 30 μm or less,
 wherein the mesh hole size of the second partial region (A2) is 100 μm or more and 500 μm or less, and
 wherein pressure of the skirt is less than 2 kPa when flow velocity is 1 knot.
2. The hydrophilic material oil fence having a double-porous mesh according to claim 1,
 wherein the floating body is formed to have a cylindrical shape or a polygonal pillar shape.
3. The hydrophilic material oil fence having a double-porous mesh according to claim 1,
 wherein the floating body has an air pocket provided at an inner portion or an outer portion thereof and made of a material having rubber or vinyl to increase buoyance.
4. The hydrophilic material oil fence having a double-porous mesh according to claim 1,
 wherein when the water surface and an area with a water depth less than 1 m have different flow velocities, the first partial region (A1) of the skirt is divided into two or more regions.
5. The hydrophilic material oil fence having a double-porous mesh according to claim 1,
 wherein a weight member is coupled and fixed to a lower end of the skirt.
6. The hydrophilic material oil fence having a double-porous mesh according to claim 5,
 wherein the weight member is fixed in a coupling hole fixed at the lower end of the skirt.
7. The hydrophilic material oil fence having a double-porous mesh according to claim 5, wherein the weight member is connected to the lower end of the skirt by a fixing member including a rope or a hook.

* * * * *